United States Patent [19]

Cross

[11] 3,738,402
[45] June 12, 1973

[54] CUTTING DIE ASSEMBLY WITH REPLACEABLE BLADES

[76] Inventor: Tallyrand Cross, 4605 Farm Valley Road, Medford, Oreg. 97501

[22] Filed: Aug. 31, 1971

[21] Appl. No.: 176,537

[52] U.S. Cl. .................. 144/197, 83/685, 83/698, 76/107 C, 29/526
[51] Int. Cl. ............................................ B27m 1/04
[58] Field of Search .................. 76/107; 146/203; 144/196, 197; 30/130, 301, 302, 316; 29/526, 445; 83/698, 669, 685

[56] References Cited
UNITED STATES PATENTS

| | | | |
|---|---|---|---|
| 2,495,221 | 1/1950 | Berlin | 76/107 C |
| 3,263,549 | 8/1966 | Jordan et al. | 83/698 |
| 3,335,628 | 8/1967 | Simms et al. | 76/107 C |

FOREIGN PATENTS OR APPLICATIONS

| | | | |
|---|---|---|---|
| 776,369 | 6/1957 | Great Britain | 76/107 C |

*Primary Examiner*—Andrew R. Juhasz
*Assistant Examiner*—W. D. Bray
*Attorney*—Clarence A. O'Brien and Harvey B. Jacobson

[57] ABSTRACT

A cutting die assembly comprised of male and female die structures each being of multi-piece construction including a rigid mounting base and cutting blades together with means for convenient disassembly for replacement of the cutting blades which have suffered damage or excessive wear, thereby permitting reuse, rather than disposal, of each mounting base.

8 Claims, 5 Drawing Figures

PATENTED JUN 12 1973

Tallyrand Cross
INVENTOR.

BY Clarence A. O'Brien
and Harvey B. Jacobson
Attorneys

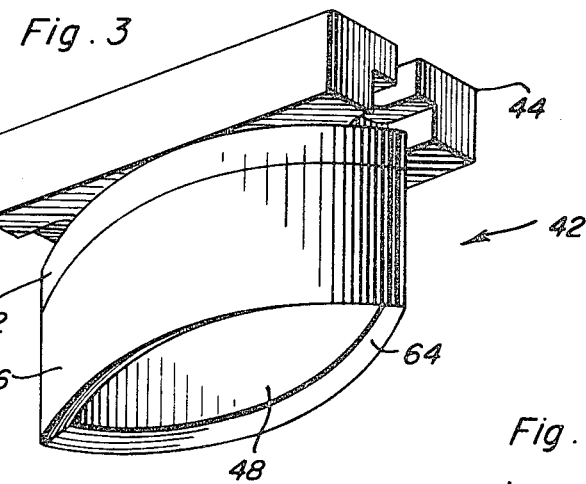
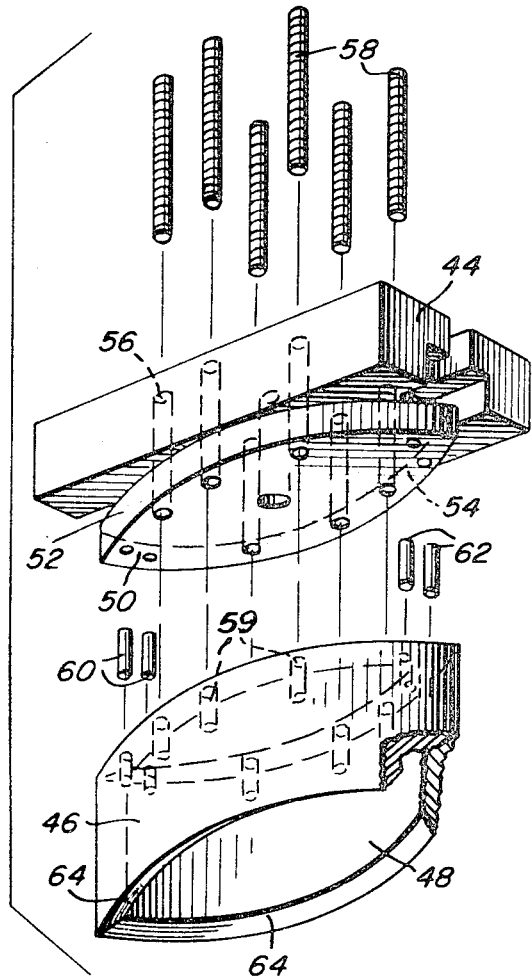
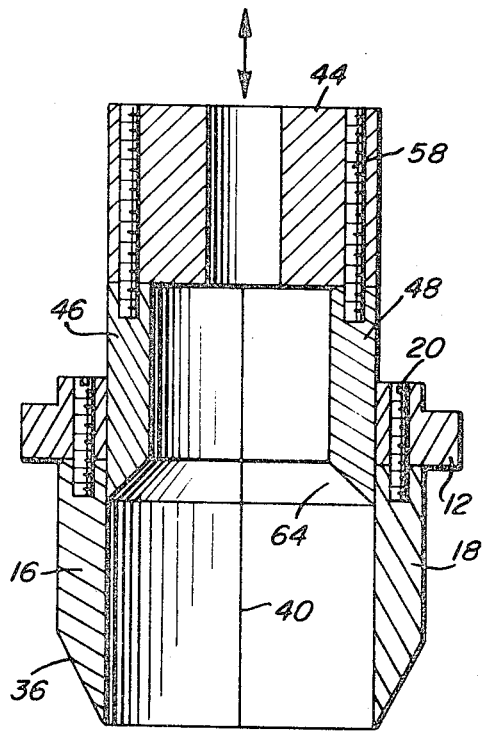
Tallyrand Cross
INVENTOR.

CUTTING DIE ASSEMBLY WITH REPLACEABLE BLADES

The present invention is generally related to cutting dies and, more particularly, to plywood patching machine dies, and the like.

In the past, a variety of plywood patching machine dies have been available. However, these dies have been of single-piece construction and of relatively short life, requiring frequent replacement upon wear of the cutting blades. Such replacement was costly due to the fact that the mounting base as well as the cutting blades were included in the one-piece construction. While this throw-away concept may be of some convenience, it becomes extremely costly for manufacturers using such dies in great numbers or on a continuous basis.

It is an object of the present invention to provide a novel multi-piece patching die construction which permits easy removal of the cutting blades from a mounting base for sharpening or replacement thereof, thereby reducing the over-all operating cost of the patching dies procedure.

Another object of the present invention is to provide a versatile patching die comprising a rigid mounting base and a pair of removable curved cutting blades fastened thereto by bolts and dowels which assure secure fastening and proper alignment upon reassembly.

It is a further object of the present invention to provide a unique multi-piece patching die assembly which permits convenient removal of the cutting blades for repair or replacement, yet, is relatively simple in overall construction, durable, long lasting, and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an exploded perspective view of the male die structure shown in FIG. 3;

FIG. 4 is a perspective view of the male die structure associated with the present invention; and FIG. 5 is a sectional view of the die assembly of the present invention with the male and female die structures mated together.

Figure 1:
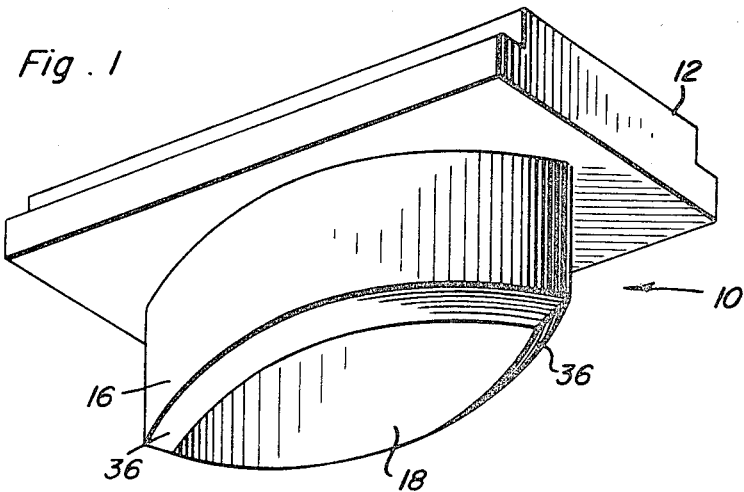
FIG. 1 is a perspective view of the female die structure associated with the present invention.
Figure 2:
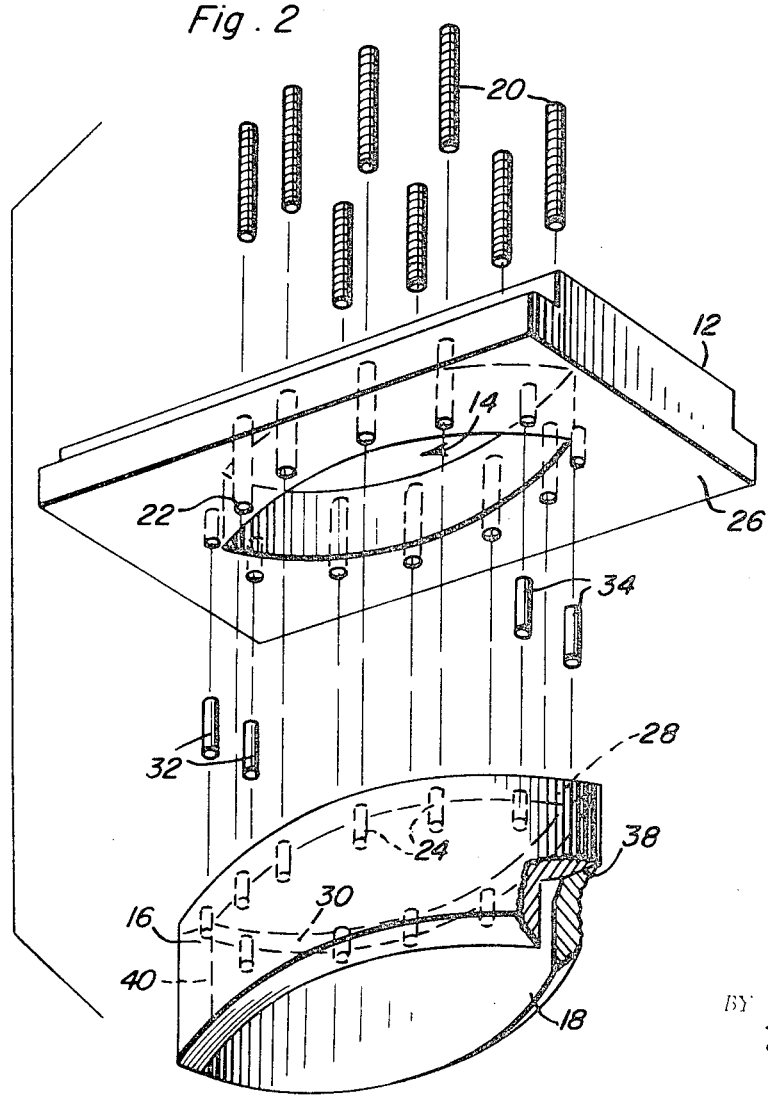
FIG. 2 is an exploded perspective view of the female die structure shown in FIG. 1.

Referring now, more particularly, to FIGS. 1 and 2, the female die structure associated with the present invention is generally indicated by the numeral 10 and includes a generally rectangular rigid mounting base 12 adapted to be mounted to a conventional plywood patching machine, or similar equipment. Mounting base 12 is provided with a centrally located, arcuately-formed opening adapted to receive a correspondingly shaped pair of male cutting blades as hereinafter explained. A pair of elongated curved cutting blades 16 and 18 are fastened to mounting base 12 by way of a plurality of threaded stud members 20 which are threadedly received in mounting holes 22 formed in mounting base 12 and mounting apertures 24 formed in each cutting blade.

The lower surface 26 of mounting base 12 is substantially flat in shape and is adapted to snugly engage the upper mounting edge portions 28 and 30 associated with cutting blades 16 and 18, respectively. In addition, two pairs of alignment dowels 32 and 34 extend between mounting base 12 and mounting edge portions 28 and 30 of the cutting blades to assure proper alignment during reassembly. Each cutting blade is provided with a beveled edge cutting portion 36 which slopes upwardly and outwardly from the bottommost edges of each cutting blade to define a curved cutting edge.

Cutting blades 16 and 18 are separable from each other, each including a pair of beveled end surfaces 38 and 40 adapted to flushly engage the corresponding portion of the other cutting blade. Preferably, the top ends of threaded fastening mmembers 20 are provided with Allen wrench fittings, or the like, to facilitate tightening of the cutting blades to the mounting base upon reassembly.

It will be appreciated, that the multi-piece die structure of the present invention provides a versatile means for repair or replacement of the curved cutting blades without the need for replacing the costly mounting base. With conventional die constructions, it was necessary to replace the entire structure including the mounting base, such resulting in the waste of costly materials. Furthermore, due to the awkwardness of these conventional one-piece constructions, it was often impractical or impossible to sharpen or repair the cutting blades. With the multi-piece construction of the present invention, the costly replacement of the mounting base is eliminated, and the cutting blades may be easily repaired or replaced in a minimum amount of time. The threaded fastening members 20, together with alignment dowels 32 and 34 assure a snug and proper fit between the component pieces upon reassembly.

Referring to FIGS. 3 and 4, the male die structure associated with the present invention may be seen in detail. The male die structure is similar in construction to the above-described female structure and is generally indicated by the numeral 42 and includes a generally rectangular rigid mounting base 44, to which are attached a pair of curved cutting blades 46 and 48. Mounting base 44 includes a flat mounting surface 50 defined by a pair of downwardly extending arcuate side portions 52 and 54. Mounting base 44 is further provided with a plurality of threaded mounting holes 56 adapted to receive threaded fastening members 58 which extend therethrough for engagement with threaded apertures 59 formed in the top edge portions of cutting blades 46 and 48. In addition, two pairs of alignment dowels 60 and 62 extend between mounting base 44 and the cutting blades to assure proper alignment therebetween. Each cutting blade includes a beveled cutting edge portion 64 which slants upwardly and inwardly, as shown in FIGS. 3 and 4. The end edge of portions 66 and 68 of cutting blades 46 and 48 are beveled in a manner similar to those of the female die structure, as explained above, to assure flush engagement between the cutting blades. The assembly and disassembly of the male die structure is similar to that of the female structure and the attributes of the female structure apply, likewise, to the male die structure.

Referring to FIG. 5, the relationship between the male and female die structures in the mated condition may be more fully appreciated. It will be noted that male cutting blades 46 and 48 are curved in a shape corresponding to that of central opening 14 in the female mounting base 12. The outside dimensions of the male cutting blades are such that they are maintained in substantially flush sliding engagement with the inner surfaces of opening 14 and female cutting blades 16 and 18. This engagement is essential if proper cutting results are to achieved. This is assured by the over-all rigidity of the male and female die structures achieved by the unique mounting arrangement of the component pieces, as described above.

It will be appreciated from the foregoing description that the multi-piece patching die assembly of the present invention provides a convenient means for the repair or replacement of the die cutting blades, yet, provides a die structure which is relatively simple in over-all construction, durable, long lasting, and relatively inexpensive to manufacture. The patching die assembly of the present invention results in a substantial cost savings compared with conventional dies utilized for the same manufacturing purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A die assembly comprising male and female die structures each including a rigid mounting base generally rectangular in configuration and including a substantially flat mounting surface, a pair of oppositely disposed elongated curved cutting blades removably connected to each of said mounting bases, each of said cutting blades including an arcuate beveled edge portion defining one longitudinal edge portion and a flat mounting edge portion defining the opposite longitudinal edge portion, said flat mounting portions normally abutting the flat mounting surface on the corresponding mounting base, and means for selectively fastening said curved cutting blades to the corresponding mounting base.

2. The assembly set forth in claim 1 wherein the cutting blades of said male die structure include outer surfaces each having a size and configuration approximating those of the inner surfaces associated with the female cutting blades such that the male cutting blades are in snug sliding engagement with said female cutting blades.

3. The assembly set forth in claim 1 wherein the fastening means associated with said male and female die structures each include a plurality of threaded fasteners extending between the respective mounting bases and cutting blades to rigidly secure the cutting blades against movement relative to the corresponding mounting base.

4. The assembly set forth in claim 3 wherein the cutting blades of said male die structure include outer surfaces each having a size and configuration approximating those of the inner surfaces associated with the female cutting blades such that the male cutting blades are in snug sliding engagement with said female cutting blades.

5. The structure set forth in claim 4 wherein each of said mounting bases includes a plurality of arcuately spaced mounting holes normally aligned with the flat mounting edge portions of the corresponding cutting blades.

6. The assembly set forth in claim 5 wherein each of said cutting blades includes a plurality of mounting apertures spaced along the flat mounting edge portions thereof and being aligned with corresponding mounting holes in said mounting base.

7. The assembly set forth in claim 6 wherein said fastening means includes a plurality of threaded fasteners extending between said mounting holes and said mounting apertures for rigidly securing said cutting blades against movement relative to the corresponding mounting base.

8. The assembly set forth in claim 7 wherein said fastening means further includes a plurality of alignment dowels extending between and snugly received by corresponding mounting holes and mounting apertures formed in the cutting blades, respectively.

* * * * *